(12) United States Patent
Zhu et al.

(10) Patent No.: US 9,305,070 B2
(45) Date of Patent: Apr. 5, 2016

(54) CONTINUOUS CHANGE DATA CAPTURE WITHOUT DISRUPTION OF DDL

(71) Applicant: Sybase, Inc., Dublin, CA (US)

(72) Inventors: Jianbing Zhu, Shanghai (CN); Derek Reiger, Bloomfield, CO (US)

(73) Assignee: Sybase, Inc., Dublin, CA (US)

( * ) Notice: Subject to any disclaimer, the term of this patent is extended or adjusted under 35 U.S.C. 154(b) by 165 days.

(21) Appl. No.: 13/821,624

(22) PCT Filed: Dec. 31, 2012

(86) PCT No.: PCT/CN2012/088090
§ 371 (c)(1),
(2) Date: Mar. 8, 2013

(87) PCT Pub. No.: WO2014/101207
PCT Pub. Date: Jul. 3, 2014

(65) Prior Publication Data
US 2014/0304229 A1    Oct. 9, 2014

(51) Int. Cl.
*G06F 17/30* (2006.01)

(52) U.S. Cl.
CPC ......... *G06F 17/30575* (2013.01); *G06F 17/30* (2013.01); *G06F 17/30292* (2013.01)

(58) Field of Classification Search
None
See application file for complete search history.

(56) References Cited

U.S. PATENT DOCUMENTS

| | | | |
|---|---|---|---|
| 6,889,231 B1 * | 5/2005 | Souder et al. | |
| 7,603,389 B2 | 10/2009 | Holenstein et al. | |
| 8,266,101 B1 | 9/2012 | Shuai | |
| 8,306,947 B2 | 11/2012 | Broeder et al. | |
| 2004/0098425 A1 * | 5/2004 | Wiss et al. | 707/204 |
| 2009/0300075 A1 * | 12/2009 | Guan et al. | 707/202 |
| 2012/0246179 A1 * | 9/2012 | Garza et al. | 707/752 |

OTHER PUBLICATIONS

International Search Report directed to related International Application No. PCT/CN2012/088090, mailed on Oct. 3, 2013; 3 pages.
Written Opinion directed to related International Application No. PCT/CN2012/088090, mailed on Oct. 3, 2013; 4 pages.

* cited by examiner

*Primary Examiner* — Anh Tai Tran
(74) *Attorney, Agent, or Firm* — Sterne, Kessler, Goldstein & Fox PLLC

(57) ABSTRACT

A system, method and computer-readable medium for data capture for replication are provided. A data record from a transaction log of a source database indicative of a data element change is retrieved. A DDL command is generated from the retrieved data record. Once generated, the DDL command is distributed for replication to a target database such that the source database and the target database are synchronized.

18 Claims, 4 Drawing Sheets

CONTINUOUS CHANGE DATA CAPTURE WITHOUT DISRUPTION OF DDL

BACKGROUND

1. Field

This disclosure relates generally to databases and, more specifically, to database replication.

2. Background Art

A replication agent allows users to maintain data in separate databases. For example, a replication agent replicates data from a source database to a target database. After replication, the target database contains accurate and current copies of data found in the source database. This ensures that the data in the source and target databases is synchronized, and allows a user to retrieve data from either a source or a target database, as well as rely on the target database in case of the source database failure.

Conventionally, a source database includes transaction logs to which it writes data definition language (DDL) commands, data manipulation language (DML) commands, data control language (DCL) commands, and/or transaction control language (TCL) commands. The DDL commands define tables, schemas, indexes, etc., in the source database. Example data definition statements include statements for making changes to data elements. Example changes to data elements include adding or deleting a table, truncating a table, adding a column to a table, removing a column from a table, and adding an index to a table, to name a few examples. To replicate those DDL commands, a conventional replication agent reads the transaction logs in the source database, identifies the DDL commands and transmits those DDL commands to target databases.

Some source databases do not write log records for changes to data elements such as tables, schemas, indexes, etc. As a result, DDL and other commands are not stored in transaction logs of the source database. However, in a heterogeneous system environment, target databases may require DDL commands to change their tables, schemas, indexes, etc., so that they are synchronized with the non-schema based databases. Whether a database does or does not require DDL commands to change data elements is of little difference to the user, provided the user's view of the data is consistent. The user however, relies on data synchronization between the source and target databases in the heterogeneous database system. As a result, there is a need for an improved replication technique to synchronize databases that do not write log records for changes to data elements (such as DDL and other commands), with the databases that require log records to maintain information associated with tables, schemas and indexes.

Additionally, some source databases do not allow direct access to their transaction logs. This occurs when a source database and a target database are developed by different parties who want to restrict access to data. Instead, an application programming interface (API) may be provided to retrieve data from the transaction logs. Therefore, there is also a need for a replication technique to synchronize a source and target databases using data records retrieved from transaction logs of the source database using an API.

BRIEF SUMMARY

Disclosed embodiments include systems, methods and computer-readable media for data capture for replication. A data record from a transaction log of source database indicative of a data element change is retrieved. A DDL command is generated from the retrieved data record. Once generated, the DDL command is distributed for replication to a target database such that the source database and the target database are synchronized.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
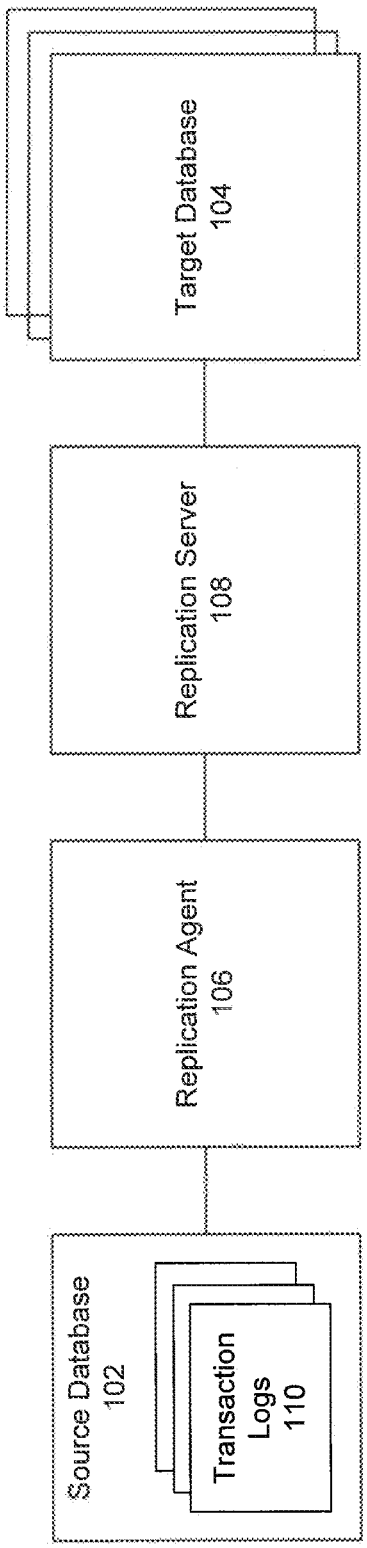
FIG. 1 is a block diagram of an exemplary database replication system.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1 is a block diagram of an exemplary database system 100. Database system 100 includes a source database 102, target database 104, a replication agent 106, and a replication server 108.

Source database 102 may be any type of a database and may include, but is not limited to, a device having a processor and a memory for executing and storing instructions. Source database 102 may include software, firmware and hardware or any combination thereof. The software may include one or more applications that create, delete and modify database tables, schemas, indexes, data, etc., stored in those tables. The hardware may include a processor and a memory.

Source database 102 stores data in a set of tables as defined by a developer, another system or a user. Source database 102 receives transactions from a user or another computing device that may manipulate data included in the database, as well as tables, schemas, indexes, etc. Example transactions include retrieving, adding, modifying, and deleting data, tables and indexes in source database 102.

In another embodiment, source database 102 does not store log records that include explicit changes to its tables, columns or indexes. A person skilled in the art will appreciate that those log records may include data records such as DDL or other commands that may describe changes to the organization and structure of data in the database. The log records may include changes that add, modify or delete tables, columns, data types, and indexes, to name a few examples. An example database that does not store log records that include explicit changes, such as DDL commands, to tables, columns or indexes may be a DB2 relational database developed by IBM of Armonk, N.Y.

Target database 104 is a database in database system 100 that includes a copy of the state, data, tables, data types, indexes, etc., of source database 102. Target database 104 may also include, but is not limited to, a device having a processor and a memory for executing and storing instructions. Target database 104 may include software, firmware and hardware or any combination thereof. The software may include one or more applications that create, delete and modify database tables, schemas, indexes, data, etc., stored in those tables. The hardware may include a processor and a memory.

Target database 104 may be a database that uses DDL or other commands to manipulate tables, indexes and schemas.

When changes to data, tables, indexes occur in source database 102 as part of user or system initiated transactions, database system 100 replicates those changes to target database 104, such that source database 102 and target database 104 are synchronized.

In an embodiment, source database 102 and target database 104 are synchronized over a network (not shown). A network may be any type of a network or combination of networks such as, but not limited to, a local area network, wide area network or the Internet. A network may be any form of a wired network or a wireless network, or a combination thereof. Also, a network allows source database 102, replication agent 106, replication server 108 and target database 104 to communicate among each other.

Replication agent 106 and replication server 108 allow for synchronization between source database 102 and target database 104. Replication agent 106 retrieves transactions from source database 102 and distributes them to target databases 104 using replication server 108. When transactions are successfully processed by target database 104, source database 102 and target database 104 become synchronized.

Source database 102 includes transaction logs 110. Transaction logs 110 store data records that include data that is replicated by replication agent 106 to target databases 104. Example transaction logs 110 may include text logs, database tables, etc. Transaction logs 110 may be created and/or maintained by source database 102. In some embodiments, transaction logs 110 may also be created and/or maintained by replication agent 106.

Replication agent 106 replicates transactions for tables and schemas stored in transaction logs 110 of source database 102. To replicate each transaction, replication agent 106 scans transaction logs 110 for data records having relevant transactions. When replication agent 106 identifies relevant transactions in transaction logs 110, it communicates those transactions to replication server 108. Replication agent 106 may be a stand-alone application that is independent of source database 102, replication server 108 or other components in database system 100. Replication agent 106 may also execute on the same or different computing device as source database 102, replication server 108 and target database 104.

Replication server 108 receives and processes transactions and data received from replication agent 106. Replication server 108 disseminates those transactions to target databases 104 or other replication servers 108, where they are processed. In an embodiment, replication server 108 may guarantee the transaction delivery. When transaction delivery is guaranteed, each transaction successfully received from replication agent 106 is guaranteed for delivery to an appropriate target database 104.

A conventional replication agent scans data records in transaction logs of a source database and distributes them to target databases. However, in a heterogeneous database environment that includes multiple source and target databases, several issues arise. First, a conventional source database may be a database that does not generate explicit log records for commands, such as DDL commands, that modify tables, columns or indexes in the source database, whereas a target database relies on the DDL commands to maintain its tables, columns and indexes. In this case, log records that pertain to changes made to tables, indexes and schemas cannot be distributed from source database to target database because data in data records does not mean the same thing to the source database as it does to the target database. Second, source database 102, replication agent 106 and target database 104 may be designed by different vendors, where each vendor may specify access restrictions to transaction logs. This means that a conventional replication agent may be restricted from accessing transaction logs from which it would otherwise be able to retrieve data for synchronization.

As described in detail in FIG. 2 below, replication agent 106 synchronizes source database 102 and a target database 104, where source database 102 does not generate log records for commands that modify tables, columns or indexes, by way of non-limiting example. Moreover, replication agent 106 also uses an API to access transaction logs 110 of sources database 102 that may otherwise be unavailable to replication agent 106.

Figure 2:
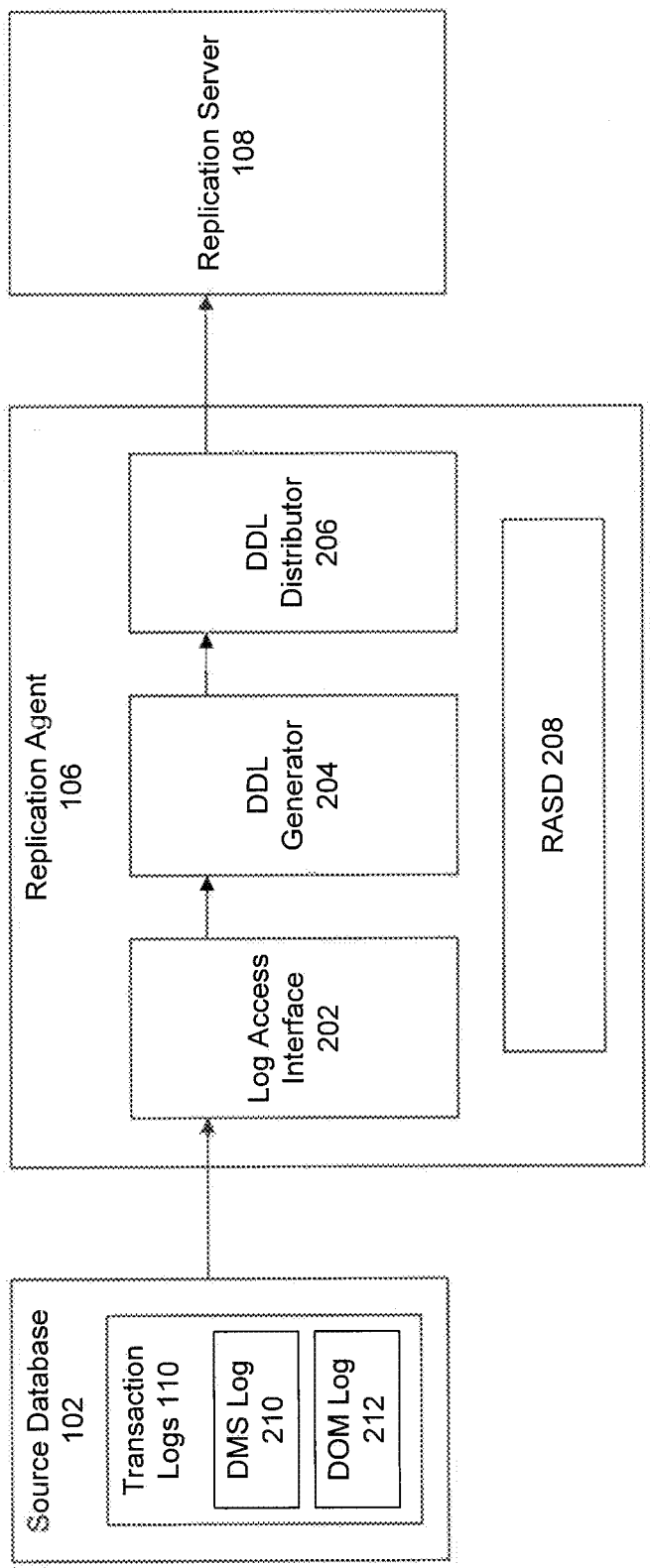
FIG. 2 is a block diagram of an exemplary replication agent.

FIG. 2 is a block diagram 200 of an exemplary embodiment of replication agent 106. As described herein, replication agent 106 captures data records that include transactions from source database 102 and replicates those transactions to target databases 104. Elements of the invention may be implemented using, for example, the Sybase Replication Agent product from Sybase, Inc. of Dublin, Calif. However, the invention is not limited to this example implementation.

Replication agent 106 includes a log access interface 202, a DDL generator 204, a DDL distributor 206 and a replication agent system database (RASD) 208. Log access interface 202 retrieves transactions from transaction logs 110 of source database 102. As described herein, log access interface 202 may access transaction logs 110 using an API associated with source database 102.

Transaction logs 110 of source database 102 may include a single transaction log or multiple transaction logs. Data records stored in transaction logs 110 may represent changes to tables, columns or indexes that are not stored as explicit DDL commands. Those changes may be stored as a single data record or a combination of data records that are included in a single or multiple transaction logs 110. In an embodiment, a data record may include a function identifier that has a value indicative to the action performed by a transaction stored in a data record. In a non-limiting example, function identifier having a value "A" may indicate that a table was created, function identifier having a value "B" may indicate that a column was added, and a function identifier having a value "C" may indicate that a column was dropped, to name a few examples.

In an embodiment, transaction logs 110 include data management system log (also referred to as "DMS" log) 210 and data object manager log (also referred to as "DOM" log) 212. Log access interface 202 uses an API to access DMS log 210, DOM log 212 or both to retrieve data records for transactions occurring in source database 102. In a Non-limiting example, DMS log 210 includes data records for adding column(s) to a table, undoing added column(s) from a table, altering a column(s), undoing the altering to a column(s), renaming a schema or a table, undoing the renaming of the schema or a table, and altering a table attribute, to name a few examples. In another non-limiting example, DOM log 212 includes data for creating an index on a table, dropping an index, dropping a table, truncating a table, creating a table, and undoing the creation of a table, to name a few examples.

In an embodiment, source database 102 may be configured to generate transaction logs 110 at a particular detail level. For example, a transaction log level may be set to store data records for all transactions that are associated with data, tables, schemas and index changes that are performed on source database 102. In an embodiment, replication agent 106 may set transaction logs 110 to a detail level that is required to retrieve information for replicating DDL commands in replication agent 106.

When log access interface 202 retrieves data records from source database 102, DDL generator 204 included in replication agent 106 generates DDL commands from the retrieved data records. A person skilled in the art will appreciate that the generated DDL commands may be distributed to target databases 104 that accept and process the DDL commands such that the data in the source database 102 and target databases 104 is synchronized.

In an embodiment, DDL generator 204 generates a DDL command compatible with a target database 104 that requires DDL and other commands to maintain schema changes to tables, columns, indexes, etc. This ensures that the DML commands that manipulate data in target database 104 are processed properly subsequent to a schema change in source database 104.

In an embodiment, DDL generator 204 generates a DDL command from a data record in a single transaction log 110, such as DMS 210 or DOM 212. In another embodiment, DDL generator 204 generates a DDL command from the data records in multiple transaction logs 110, such as DMS 210 and DOM 212. For example, DDL generator 204 generates a DDL command that creates a table using data records from DMS 210, DOM 212 or both. In one example, DDL generator 204 may receive a data record retrieved from DOM 212 that includes an identifier that a new table "T" was created. DDL generator 204 may then store this information in memory until it identifies data records from DMS 210 that include an identifier that indicate that columns "X", "Y" and "Z" were added to the created table "T". In another embodiment, DDL generator 204 may receive a data record from DMS 210 that includes an identifier that indicates that a column from a table was deleted in source database 102. Once data records for a particular function are identified, DDL generator 204 uses the data records to reconstruct a DDL command that indicates that a column was deleted.

In an embodiment, DDL generator 204 may use a predetermined set of rules to generate a particular DDL command using identifiers included in the data records. The rules, for example, may describe how a DDL command is generated from a data record or multiple data records having particular function identifiers.

Once the DDL command is reconstructed, replication agent 106 may store the reconstructed DDL command in RASD 208. RASD 208 is a database associated with replication agent 106, and may include, but is not limited to, a device having a processor and a memory for executing and storing instructions. RASD 208 may include software, firmware and hardware or any combination thereof. The software may include one or more applications that create, delete and modify database tables, schemas, indexes, data, etc., stored in those tables. The hardware may include a processor and a memory.

In another embodiment, replication agent 106 may store copies of tables, columns indexes, etc., included in source database 102 in RASD 208. Those copies may be created from the reconstructed DDL commands or loaded into RASD 208 using a daily, weekly or nightly upload from source database 102. In this embodiment, replication agent 106 may also apply the reconstructed DDL command to tables, schemas, indexes, etc., that are stored in RASD 208. In this way, the schema of target database 104 may be generated or reinstated by accessing RASD 208 in replication agent 106.

In an embodiment, RASD 208 may also include rules that DDL generator 204 uses to reconstruct DDL commands. Those rules may be reconfigured or updated by, for example, a system administrator in replication agent 106. For example, source database 102 may add an additional function identifier that indicates a new function in a data record. RASD 208 may then be updated with the rules that process the data record having a new identifier.

Once reconstructed, DDL generator 204 passes the generated DDL commands to DDL distributor 206. DDL distributor 206 distributes the reconstructed DDL commands to replication server 108. Replication server 108 then distributes the reconstructed DDL commands to target databases 104. In an embodiment, DDL distributor 206 may distribute DDL commands over a network and according to method known to a person of ordinary skill in the art. Because the reconstructed DDL commands are distributed to target databases 104, DML and other commands that manipulate data in source database 102 are properly replicated to target databases 104 before and after changes are made to tables, columns and/or indexes of source database 102.

Figure 3:
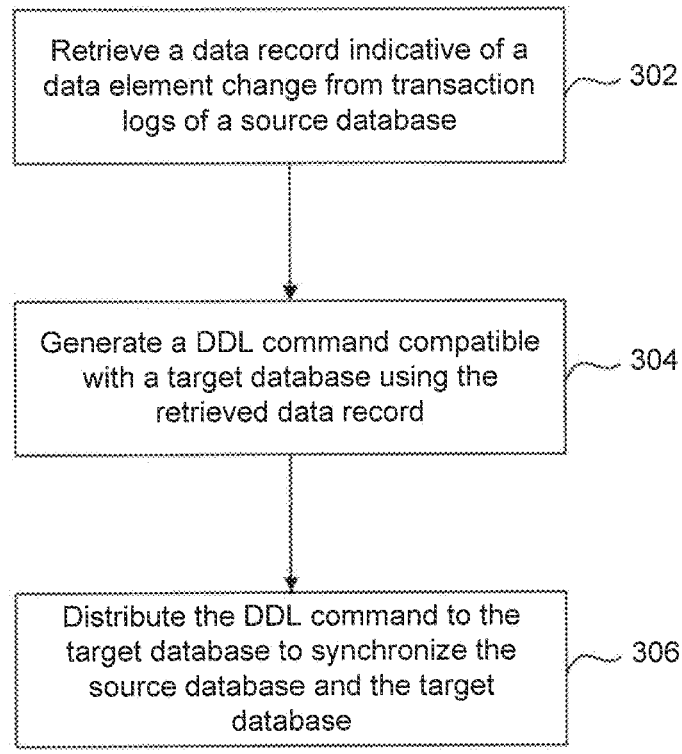
FIG. 3 is a flowchart of a method for reconstructing DDL commands from transaction logs, according to an embodiment.

FIG. 3 is a flowchart 300 of a method for reconstructing DDL commands from transaction logs.

At step 302, a data record from a transaction log is retrieved. For example, log access interface 202 retrieves data records from transaction logs 110 of source database 102 that does not generate explicit DDL or other commands that indicate changes to a schema. In an embodiment, an API is used to retrieve data records. As described herein, an identifier in the data record indicates a change in a table, index, etc., in source database 102.

At step 304, a DDL command is generated. For example, a DDL command is generated from the retrieved data record(s). As described herein, DDL generator 204 generates a DDL command using identifiers that indicate the function of the transaction in the data record. As also described herein, a DDL command may be generated from one or more data records that maybe be stored in different transaction logs 110, such as DOM 212 and DMS 210. For example, DDL generator 204 may receive a data record that includes an identifier that a new table was created. DDL generator 204 may store this data in RASD 208. DDL generator 204 may then identify data records from DMS 210 that include an identifier that indicates, for example, that three columns were added to the new table. Once DDL generator 204 identifies the columns added to the new table, DDL generator 204 may retrieve the stored data from RASD 208 and reconstruct a DDL command that indicates that a table having three columns was created in data source 102. In another embodiment, DDL generator 204 may receive a data record from DMS 210 that includes an identifier that indicates that a column from a table was deleted in source database 102. Once data records for a particular function are identified, DDL generator 204 uses the data records to reconstruct a DDL command that indicates that a column was deleted.

At step 306, a generated DDL command is distributed. For example, DDL distributor 206 distributes the generated DDL command to replication server 108. Replication server 108 then distributes the DDL command to target databases 104.

Figure 4:
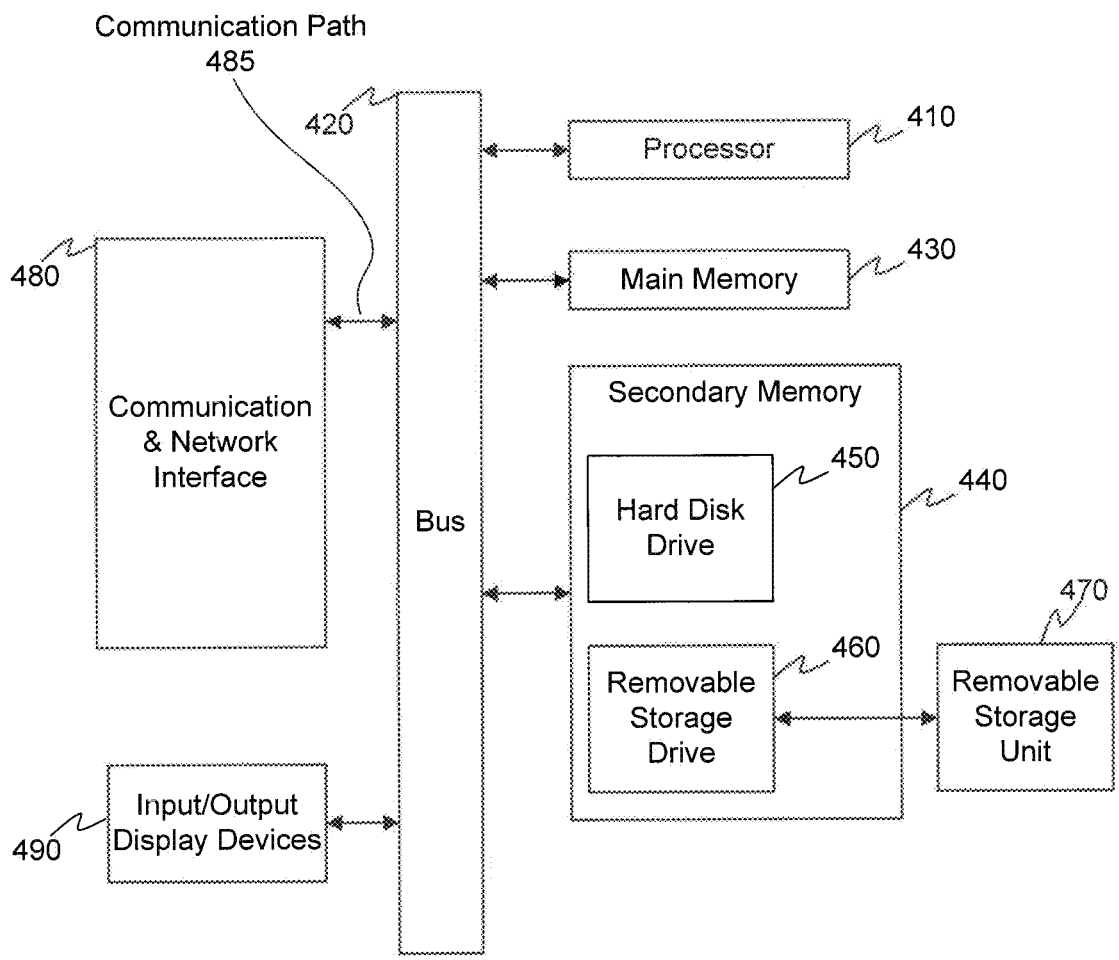
FIG. 4 is an example computer system in which embodiments of the invention can be implemented.

Various aspects of the invention can be implemented by software, firmware, hardware, or a combination thereof. FIG. 4 illustrates an example computer system 400 in which the invention, or portions thereof, can be implemented as computer-readable code. For example, the methods illustrated by flowcharts described herein can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 410. Processor 410 can be a special purpose or a general purpose processor. Processor 410 is connected to a communication infrastructure 420 (for example, a bus or network).

Computer system 400 also includes a main memory 430, preferably random access memory (RAM), and may also include a secondary memory 440. Secondary memory 440 may include, for example, a hard disk drive 450, a removable storage drive 460, and/or a memory stick. Removable storage drive 460 may comprise a floppy disk drive, a magnetic tape drive, an optical disk drive, a flash memory, or the like. The removable storage drive 460 reads from and/or writes to a removable storage unit 470 in a well-known manner. Removable storage unit 470 may comprise a floppy disk, magnetic tape, optical disk, etc. which is read by and written to by removable storage drive 460. As will be appreciated by persons skilled in the relevant art(s), removable storage unit 470 includes a computer usable storage medium having stored therein computer software and/or data.

In alternative implementations, secondary memory 440 may include other similar means for allowing computer programs or other instructions to be loaded into computer system 400. Such means may include, for example, a removable storage unit 470 and an interface (not shown). Examples of such means may include a program cartridge and cartridge interface (such as that found in video game devices), a removable memory chip (such as an EPROM, or PROM) and associated socket, and other removable storage units 470 and interfaces which allow software and data to be transferred from the removable storage unit 470 to computer system 400.

Computer system 400 may also include a communications and network interface 480. Communication and network interface 480 allows software and data to be transferred between computer system 400 and external devices. Communications and network interface 480 may include a modem, a communications port, a PCMCIA slot and card, or the like. Software and data transferred via communications and network interface 480 are in the form of signals which may be electronic, electromagnetic, optical, or other signals capable of being received by communication and network interface 480. These signals are provided to communication and network interface 480 via a communication path 485. Communication path 485 carries signals and may be implemented using wire or cable, fiber optics, a phone line, a cellular phone link, an RF link or other communications channels.

The communication and network interface 480 allows the computer system 400 to communicate over communication networks or mediums such as LANs, WANs the Internet, etc. The communication and network interface 480 may interface with remote sites or networks via wired or wireless connections.

In this document, the terms "computer program medium" and "computer usable medium" and "computer readable medium" are used to generally refer to media such as removable storage unit 470, removable storage drive 460, and a hard disk installed in hard disk drive 450. Signals carried over communication path 485 can also embody the logic described herein. Computer program medium and computer usable medium can also refer to memories, such as main memory 430 and secondary memory 440, which can be memory semiconductors (e.g. DRAMs, etc.). These computer program products are means for providing software to computer system 400.

Computer programs (also called computer control logic) are stored in main memory 430 and/or secondary memory 440. Computer programs may also be received via communication and network interface 480. Such computer programs, when executed, enable computer system 400 to implement embodiments of the invention as discussed herein. In particular, the computer programs, when executed, enable processor 410 to implement the processes of the invention, such as the steps in the methods illustrated by flowcharts discussed above. Accordingly, such computer programs represent controllers of the computer system 400. Where the invention is implemented using software, the software may be stored in a computer program product and loaded into computer system 400 using removable storage drive 460, interfaces, hard drive 450 or communication and network interface 480, for example.

The computer system 400 may also include input/output/display devices 490, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A method for data capture for replication, comprising:
   retrieving a plurality of data records from a source database, wherein at least one data record is retrieved from a first log associated with the source database and at least one data record is retrieved from a second log associated with the source database;
   parsing a first identifier included in the at least one retrieved data record from the first log and a second identifier included in the at least one retrieved data record from the second log to determine a data element change in the source database, wherein the first and second identifiers are indicative of the data element change and the first and second identifiers cannot be parsed by a target database; and
   generating a data definition language (DDL) command from the determined data element change, wherein the generated DDL command is compatible with the target database.

2. The method of claim 1, further comprising:
   distributing the generated DDL command to the target database to synchronize the source database and the target database.

3. The method of claim 1, wherein retrieving the plurality of data records further comprises using an application programming interface associated with the source database.

4. The method of claim 1, wherein at least one data record of the plurality of data records includes a change in at least one column in the data element, wherein the data element includes at least a table or a schema.

5. The method of claim 1, wherein at least one data record of the plurality of data records includes a change in quantity of columns or schemas in the source database.

6. The method of claim 1, wherein the first log is a data management system log and the second log is a data object manager log.

7. The method of claim 1, further comprising:
   storing the generated DDL command.

8. A system comprising:
   a memory configured to store modules comprising a replication agent module configured to:
   retrieve a plurality of data records from a source database, wherein at least one data record is retrieved from a first log associated with the source database and at least one data record is retrieved from a second log associated with the source database;
   parse a first identifier included in the at least one retrieved data record from the first log and a second identifier included in the at least one retrieved data record from the second log to determine a data element change in the source database, wherein the first and second identifiers are indicative of the data element change and the first and second identifiers cannot be parsed by a target database; and
   generate a data definition language (DDL) command from the determined data element change, wherein the generated DDL command is compatible with the target database; and
   one or more processors configured to execute the replication agent module.

9. The system of claim 8, wherein the replication agent module is further configured to distribute the generated DDL command to the target database to synchronize the source database and the target database.

10. The system of claim 8, wherein the replication agent module is further configured to use an application programming interface associated with the source database to retrieve the plurality of data records.

11. The system of claim 8, wherein at least one data record of the plurality of data records includes a change in at least one column in the data element, wherein the data element includes at least a table or a schema.

12. The system of claim 8, wherein at least one data record of the plurality of data records includes a change in quantity of columns or schemas in the source database.

13. The system of claim 8, wherein the first log is a data management system log and the second log is a data object manager log.

14. The system of claim 8, wherein the replication agent module is further configured to store the generated DDL command in a replication agent system database (RASD).

15. A non-transitory computer readable medium having instructions stored thereon that, when executed by a computing device, cause the computing device to perform operations for data capture for replication, the operations comprising:
   retrieving a plurality of data records from a source database, wherein at least one data record is retrieved from a first log associated with the source database and at least one data record is retrieved from a second log associated with the source database;
   parsing a first identifier included in the at least one retrieved data record from the first log and a second identifier included in the at least one retrieved data record from the second log to determine a data element change in the source database, wherein the first and second identifiers are indicative of the data element change and the first and second identifiers cannot be parsed by a target database; and
   generating a data definition language (DDL) command from the determined data element change, wherein the generated DDL command is compatible with the target database.

16. The non-transitory computer readable medium of claim 15, further comprising:
   distributing the generated DDL command to the target database to synchronize the source database and the target database.

17. The non-transitory computer readable medium of claim 15, wherein the first log is a data management system log and the second log is a data object manager log.

18. A method for replication to synchronize databases, comprising:
- retrieving a first data record from a first log of a source database and a second data record from a second log of the source database, wherein the first data record includes a first identifier, the second data record includes a second identifier, the first identifier and second identifier indicate a data element change in the source database, and the first identifier and the second identifier cannot be parsed by a target database;
- generating a data definition language (DDL) command from the first data record using the first identifier and the second data record using the second identifier, wherein the generated DDL command is compatible with a target database; and
- executing the generated DDL command on the target database to synchronize the target database with the source database.

* * * * *